United States Patent Office 3,049,474
Patented Aug. 14, 1962

3,049,474
ANTIBACTERIAL COMPOSITIONS CONTAINING
1 - METHYL - 6 - NITRO - 4 - QUINOLONE-3-CAR-
BOXYLIC ACID OR SODIUM SALT THEREOF
Walter Hepworth, Manchester, England, assignor to Imperial Chemical Industries Limited, London, England, a corporation of Great Britain
No Drawing. Filed Feb. 6, 1958, Ser. No. 713,545
Claims priority, application Great Britain Feb. 15, 1957
22 Claims. (Cl. 167—65)

This invention relates to new pharmaceutical compositions and more particularly it relates to new pharmaceutical compositions which possess useful anti-bacterial activity particularly against Salmonella infections.

We have found that 1-methyl-6-nitro-4-quinolone-3-carboxylic acid and the sodium salt thereof possess useful antibacterial activity. The synthesis of both 1-methyl-6-nitro-4-quinolone-3-carboxylic acid and the sodium salt thereof is described by J. R. Price in the Australian Journal of Scientific Research, Series A Physical Sciences, 1949, volume No. 2, pages 279–280 and again by J. L. Drummond and F. N. Lahey, ibidem, page 635. In these articles there are provided those liquid compositions of matter containing either 1-methyl-6-nitro-4-quinolone-3-carboxylic acid or the sodium salt thereof which are coincidental to but properly part of the described processes of synthesis and isolation. We have found however that the said liquid compositions per se are unsuitable, pharmaceutically and/or physiologically, for use in the treatment and prophylaxis of bacterial infections, which is a use to which, by virtue of our above-mentioned discovery, they might otherwise be applied.

According to the invention we provide new physiologically acceptable pharmaceutical compositions for the treatment and prophylaxis of bacterial infections and particularly of Salmonella infections comprising as active ingredient or ingredients 1-methyl-6-nitro-4-quinolone-3-carboxylic acid and/or the sodium salt thereof together with non-toxic pharmaceutical excipients and optionally containing also other known antibacterial agents.

As suitable compositions of the invention there may be mentioned for example compositions for systemic application in the treatment and prophylaxis of bacterial infections, particularly Salmonella infections including compositions for oral and for parenteral use.

The compositions of the invention for oral use comprise the stated active ingredient(s) and such standard pharmaceutical excipients as are commonly used in the manufacture of oral formulations for human and veterinary medication. They include for example solid compositions for example tablets and pills and dispersible powders or granules and semi-solid and liquid formulations for example pharmaceutically and physiologically acceptable syrups, solutions and dispersions, either for administration per se or after confinement in some suitable way for example in capsules.

Suitable solution formulations of 1-methyl-6-nitro-4-quinolone-3-carboxylic acid are limited to substantially non-aqueous solutions by reason of the insolubility of this material in water. Suspensions thereof can suitably be both aqueous and non-aqueous but the particulate matter contained therein must be in uniformly finely divided form, preferably of a particle size below about 100 microns. Aqueous supensions thereof may optionally contain wetting or dispersing agents, suspending agents and the like. Suitable solution formulations of the sodium salt of 1-methyl-6-nitro-4-quinolone-3-carboxylic acid are essentially limited to substantially aqueous solutions. Solutions of the sodium salt in which water is the sole solvent are limited by solubility to solutions of not more than about 0.5% strength. Such solutions, even when buffered and suitably modified with respect to alkalinity and taste are thus of little practical utility for oral purposes.

The compositions of the invention for oral use also include compositions with foodstuffs or for admixture with foodstuffs for example and particularly compositions for veterinary use. Suitable veterinary compositions which may be mentioned include for example foodstuff compositions shaped as nuts or pellets and premixes for admixture with animal foodstuffs, for example formulations with inert non-toxic diluents for example chalk, talc, kaolin, urea and lactose for admixture with solid foodstuffs for example with feeding meals and concentrates or with liquid foodstuffs for example with water or milk.

The compositions of the invention for parenteral use omprise for example sterile isotonic solutions and suspensions of the stated active ingredient(s) which can be applied by injection for example intravenously, subcutaneously or intramuscularly. These compositions include sterile isotonic aqueous solutions and suspensions and sterile isotonic non-aqueous solutions and suspensions for example oily suspensions. Those compositions which are suspensions contain their particulate matter in a finely divided form, preferably of a particle size substantially below 100 microns and those compositions which are aqueous suspensions may optionally contain small amounts of such agents as are commonly used to facilitate the manufacture and maintain the efficacy of aqueous dispersions, for example wetting or dispersing agents and suspending agents.

The injectable solutions or suspensions of the invention may be obtained sterile by known procedures for example by aseptic formulation, by Seitz filtration, by irradiation, by incorporation of sterilising agents or by heat treatment.

The said compositions for oral and for parenteral use may optionally contain other known antibacterial agents and more particularly other known systemically active antibacterial agents for example and in particular those known to possess an activity spectrum which will reinforce and/or supplement that possessed by the active ingredient(s) of the new compositions. Such other known antibacterial agents include for example antibiotics for example the penicillins and tetracyclines, the sulphonamides for example 2-p-amino-benzenesulphonamido-4:6-dimethylpyrimidine and nitrofuran derivatives for example furazolidone.

The compositions of the invention also include compositions for local application. Such compositions comprise the stated active ingredient(s) and such standard pharmaceutical excipients as are commonly used in the manufacture of pharmaceutical formulations for application to local bacterial infections, either external or internal, or to sites, for example postoperative wound beds, requiring local prophylactic antibacterial treatment. Said compositions include for example creams, ointments and finely divided powder preparations.

The said compositions for local application may optionally contain other known antibacterial agents, more particularly other known antibacterial agents which are known to be active when thus administered for example and in particular those known to possess an activity spectrum which will reinforce and/or supplement that possessed by the active ingredient(s) of the new compositions of the invention. Such other known antibacterial agents include for example the penicillins, the tetracyclines, the sulphonamides and 1:6-bis-p-chlorophenyldiguanidohexane.

The compositions of the invention may also optionally contain other known therapeutic agents not necessarily antibacterial agents but nevertheless usefully applied together with antibacterial agents for example because of some direct or indirect enhancement of antibacterial effect or some favourable action on some associated organic dysfunction for example antiprotozoal agents, anti-inflammatory agents and anti-histamines.

The compositions of the invention may be applied directly or indirectly in the treatment and prophylaxis of bacterial infections, particularly Salmonella infections in man and in animals.

The invention is illustrated but not limited by the following examples in which the parts are by weight:

*Example 1*

A mixture of 100 parts of 1-methyl-6-nitro-4-quinolone 3-carboxylic acid and 100 parts of calcium phosphate is granulated by admixture with a sufficient quantity of aqueous 10% maize-starch paste. The granules are passed through a 16-mesh screen and are then dried at 50–55° C. The dried granules are again passed through a 16-mesh screen, 1 part of magnesium stearate is then added thereto and the mixture is compressed. There are thus obtained tablets suitable for oral administration for therapeutic purposes.

*Example 2*

To a stirred mixture of 100 parts of liquid paraffin, 100 parts of cetyl alcohol and 10 parts of heptadecaethyleneoxycetanol heated to 60° C. in a conventional mixer, there is added gradually a solution, previously heated to 60° C. prepared by dissolving 14 parts of the sodium salt, of 1-methyl-6-nitro-4-quinolone-3-carboxylic acid in a mixture of 70 parts of glycerol and 1,130 parts of water. Stirring is continued until a cream is formed and the temperature falls to 40° C. The mixture is then homogenised by passage through a colloid mill and there is thus obtained a cream suitable for topical application for therapeutic purposes.

*Example 3*

1 part of refined soya bean lecithin, 0.1 part of sorbitan monooleate polyethylene oxide condensate, 0.5 part of polyvinyl pyrrolidone and 0.2 part methyl p-hydroxybenzoate are mixed with 98 parts of pyrogen-free water and the mixture is sterilised by heating in an autoclave at 10–15 lbs. per sq. in. pressure for 30 minutes. To the sterile aqueous base so obtained there are added 10 parts of sterile micropulverised sodium salt of 1-methyl-6-nitro-4-quinolone-3-carboxylic acid. The mixture is ball milled for fifteen minutes and there is thus obtained a sterile suspension suitable for parenteral injection for therapeutic purposes.

*Example 4*

80 parts of sterile micropulverised calcium salt of phenoxymethyl penicillin, 100 parts of sterile micropulverised sodium salt of 1-methyl-6-nitro-4-quinolone-3-carboxylic acid and 1 part of sterile methyl cellulose are mixed in a conventional mixer and there is added thereto a solution of 1 part of refined soya bean lecithin and 0.2 part of sorbitan monooleate polyethylene oxide condensate in 30 parts of ether which solution has been sterilised by filtration. The mixture is stirred until the ether has evaporated after which it is dried and passed through a micropulveriser. There is thus obtained a water-dispersible powder suitable for parenteral use for therapeutic purposes.

*Example 5*

A mixture of 2 parts of aluminium stearate and 98 parts of arachis oil is heated slowly with agitation to a temperature of 120° C. This temperature is maintained for 1 hour when gelling is complete and is then raised to 150° C. which temperature is maintained for a further 1 hour. The gel is then cooled and 10 parts of sterile micropulverised sodium salt of 1-methyl-6-nitro-4-quinolone-3-carboxylic acid is incorporated therein by stirring. There is thus obtained a suspension suitable for intramuscular injection for therapeutic purposes.

*Example 6*

A mixture of 250 parts of the sodium salt of 1-methyl-6-nitro-4-quinolone-3-carboxylic acid, 80 parts of maize starch and 20 parts of lactose is granulated by admixture with a sufficient quantity of 6% maize-starch paste. The granules are passed through an 8-mesh sieve and are then dried at 50° C. After further passage through a 16-mesh sieve 0.5 part of magnesium stearate is added and the mixture is compressed. The tablets so obtained are rotated in a conventional pan and coated with a solution prepared from 1 part of cetyl alcohol, 1 part of stearic acid, 2 parts of shellac and 6 parts of ethanol. After coating the tablets are dried and the coating procedure is repeated until a coating of the desired thickness is obtained. There are thus obtained coated tablets suitable for oral use for therapeutic purposes.

*Example 7*

A mixture of 10 parts of 1-methyl-6-nitro-4-quinolone-3-carboxylic acid, 20 parts of sucrose, 0.05 part of cetyl alcohol polyethylene oxide condensate, 1 part of carboxy methyl cellulose, 0.2 part of methyl p-hydroxybenzoate and 85 parts of water is ball-milled for 4 hours. After the further addition of suitable flavouring material and colouring material there is obtained a suspension suitable for oral use for therapeutic purposes.

*Example 8*

900 parts of icing sugar, 20 parts of gum tragacanth and 35 parts of the sodium salt of 1-methyl-6-nitro-4-quinolone-3-carboxylic acid are mixed in a conventional mixer and there is added thereto a solution prepared from 2.5 parts of methyl p-hydroxybenzoate, 0.25 part of propyl p-hydroxybenzoate, 0.75 part of cetyl alcohol polyethylene oxide condensate and 35 parts of ethanol 74 O.P. Mixing is continued and sufficient 50% aqueous ethanol is added to give a mass suitable for granulation. The mass is granulated by passage through a 12 mesh screen, and the granules are dried at 50° C. The dried granules are charged to a tumbler mixer, 6 parts of a strawberry flavouring material are added and mixing is continued until the product is homogeneous. There are thus obtained water-dispersible granules suitable for oral use for therapeutic purposes.

*Example 9*

A mixture of 180 parts of finely ground 2-p-aminobenzenesulphonamido - 4:6-dimethylpyrimidine, 30 parts of 1 - methyl-6-nitro-4-quinolone-3-carboxylic acid, 700 parts of icing sugar and 10 parts of gum tragacanth is charged to a conventional mixer. A solution prepared from 2 parts of methyl p-hydroxybenzoate, 0.2 part of propyl p-hydroxybenzoate, 1.5 parts of a cetyl alcohol polyethylene oxide condensate and 35 parts of ethanol is added to the stirred mixture followed by sufficient 50% aqueous ethanol to give a mass suitable for granulation. The mass is granulated by passage through a 12-mesh screen and dried at 50° C. After further mixing with a suitable flavouring agent there are obtained water-dispersible granules suitable for oral use for therapeutic purposes.

*Example 10*

A mixture of 500 parts of the sodium salt of 1-methyl-6-nitro-4-quinolone-3-carboxylic acid and 70 parts of calcium phosphate is granulated by admixture with a sufficient quantity of aqueous 10% maize-starch paste. The mass is passed through a 12-mesh screen and the granules are dried at 60° C. until the moisture content thereof is less than 0.5%. 100 parts of potassium phenoxymethyl penicillin and 5 parts of magnesium stearate are mixed by passage through a 60-mesh screen and the screened mixture so obtained is mixed with the granules and the resulting mixture is compressed. There are thus obtained tablets suitable for oral use for therapeutic purposes.

Example 11

A mixture of 250 parts of 2-p-aminobenzenesulphonamido-4:6-dimethylpyrimidine, 250 parts of the sodium salt of 1-methyl-6-nitro-4-quinolone-3-carboxylic acid and 75 parts of maize starch is granulated by admixture with 10% maize-starch paste. The granular mass is passed through a 12-mesh screen and the granules so obtained are dried at 50° C. 1.5 parts of magnesium stearate are added to the dried granules and the mixture is then compressed to give tablets suitable for oral use for therapeutic purposes.

Example 12

A mixture of 150 parts of the sodium salt of 1-methyl-6-nitro-4-quinolone-3-carboxylic acid, 300 parts of acetyl salicylic acid, 32.5 parts of citric acid, and 130 parts of maize starch is granulated by admixture with a sufficient quantity of ethanol. The granular mass is passed through a 12-mesh screen and the granules are dried at 50° C. After further sieving through a 16-mesh screen the granules are mixed with 100 parts of calcium phosphate, 65 parts of lactose and 7 parts of magnesium stearate. The mixture so obtained is then compressed into tablets suitable for oral use for therapeutic purposes.

Example 13

20 parts of furazolidone, 20 parts of 1-methyl-6-nitro-4-quinolone-3-carboxylic acid, 7 parts of iron oxide and 150 parts of talc are mixed in a suitable mixer. The mixture is then ground and blended with 350 parts of talc in a suitable blender. There is thus obtained a premix suitable for blending with animal feeding stuffs for therapeutic purposes.

Example 14

To a stirred mixture of 200 parts of stearic acid and 5 parts of cetostearyl alcohol heated at 65° C. in a conventional mixer there is added a solution at 60° C. prepared from 80 parts of glycerol, 12 parts of triethanolamine, 3.6 parts of sodium hydroxide, 10 parts of the sodium salt of 1-methyl-6-nitro-4-quinolone-3-carboxylic acid and 700 parts of water and stirring is continued after mixing while the temperature is allowed to fall to 40° C. The mixture is then homogenised by passage through a colloid mill and there is thus obtained a vanishing cream suitable for topical application for therapeutic purposes.

Example 15

A solution of 0.1 part of the sodium salt of 1-methyl-6-nitro-4-quinolone-3-carboxylic acid in 2 parts of distilled water heated at 65° C. is added with stirring to a mixture of 10 parts of lanolin and 87 parts of white soft paraffin heated at 65° C. Stirring is continued until the mixture is cool and there is thus obtained an ointment suitable for topical application for therapeutic purposes.

Example 16

A solution prepared from 5 parts of the sodium salt of 1-methyl-6-nitro-4-quinolone-3-carboxylic acid, 5 parts of glycerol, 0.15 part of methyl p-hydroxybenzoate, 0.02 part of propyl p-hydroxybenzoate, 0.5 part of sodium lauryl sulphate and 90 parts of water is heated at 60° C. and added with stirring to a melted mixture of 1.5 parts of cetostearyl alcohol and 0.1 part of white wax. The mixture is stirred rapidly until a uniform emulsion is obtained after which it is allowed to cool slowly with continuous stirring. There is thus obtained a lotion suitable for topical application for therapeutic purposes.

Example 17

100 parts of the sodium salt of 1-methyl-6-nitro-4-quinolone-3-carboxylic acid are uniformly mixed with 100 parts of lactose and the resulting mixture is then filled into hard gelatine capsules.

Example 18

100 parts of the sodium salt of 1-methyl-6-nitro-4-quinolone-3-carboxylic acid are mixed with 300 parts of peanut oil. The mixture is then filled into soft gelatine capsules.

Example 19

25 parts of pulverised chlortetracycline hydrochloride, 25 parts of the sodium salt of 1-methyl-6-nitro-4-quinolone-3-carboxylic acid and 250 parts of liquid paraffin are intimately mixed and the mixture is added to a mixture of 1200 parts of white petrolatum and 170 parts of anhydrous lanolin. The mixture is stirred to a uniform consistency and is then allowed to cool to room temperature after which it is filled into tubes. There is thus obtained an ointment suitable for topical application for therapeutic purposes.

Example 20

To an intimate mixture of 25 parts of magnesium carbonate and 50 parts of corn starch there is added gradually a mixture of 100 parts of the sodium salt of 1-methyl-6-nitro-4-quinolone-3-carboxylic acid and 100 parts of oxytetracycline hydrochloride. There is thus obtained a dusting powder for topical application for therapeutic purposes.

Example 21

To a mixture of 380 parts of olive oil and 20 parts of oleic acid heated to 80° C. there is added a solution prepared from 91.7 parts of potassium hydroxide, 50 parts of glycerine and 100 parts of water. The mixture is stirred and heated at 80° C. until saponification is complete. To the hot solution there is added a solution at 60° C. of 10 parts of the sodium salt of 1-methyl-6-nitro-4-quinolone-3-carboxylic acid in sufficient water to produce 1000 parts of the final product. After stirring to a uniform consistency the product is allowed to cool to room temperature. There is thus obtained an ointment suitable for topical application for therapeutic purposes.

Example 22

0.1 part of the sodium salt of 1-methyl-6-nitro-4-quinolone-3-carboxylic acid and 9 parts of sodium chloride are dissolved in 90 parts of pyrogen-free water. The solution is filled into ampoules which are then heated in an autoclave at 10–15 lbs./sq. in. pressure for 30 minutes. There is thus obtained a solution suitable for topical use for therapeutic purposes.

Example 23

1.25 parts of hydrocortisone acetate are uniformly suspended in a solution prepared from 0.25 part of the sodium salt of 1-methyl-6-nitro-4-quinolone-3-carboxylic acid, 5 parts of glycerine, 1.5 parts of a cetyl alcohol polyethylene oxide condensate and 50 cc. of water and the suspension is added to a stirred mixture of 5 parts of liquid paraffin, 10 parts of arachis oil and 7 parts of cetyl alcohol heated at 60° C. The mixture is stirred until emulsification is complete and until the product is cool. There is thus obtained a cream suitable for topical application for therapeutic purposes.

The structural formula of 1-methyl-6-nitro-4-quinolone-3-carboxylic acid is:

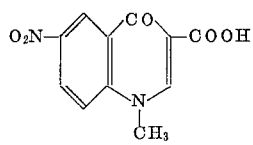

What I claim is:

1. The process for the treatment of bacterial infections in man and animals which comprises administering to said man and animals an effective amount of a compound selected from the group consisting of 1-methyl-6-nitro-4-quinolone-3-carboxylic acid of the formula:

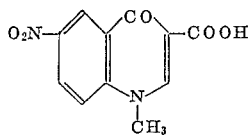

and the sodium salt thereof.

2. A solid antibacterial composition in a form suitable for oral administration and comprising as active ingredient a compound selected from the group consisting of 1-methyl-6-nitro-4-quinolone-3-carboxylic acid and the sodium salt thereof, and a solid, non-toxic, orally-ingestible pharmaceutical carrier, said composition also including at least one member of the group consisting of granulating agents, dispersing agents and flavoring agents.

3. A solid antibacterial composition in a form suitable for oral administration and comprising as active ingredient a compound selected from the group consisting of 1-methyl-6-nitro-4-quinolone-3-carboxylic acid and the sodium salt thereof, and a solid, non-toxic, orally-ingestible pharmaceutical carrier, said composition also containing an antibacterial agent selected from the group consisting of penicillins, tetracyclines, sulphonamides and nitrofurans.

4. A semi-solid, antibacterial composition in a form suitable for oral administration which comprises as active ingredient a compound selected from the group consisting of 1-methyl-6-nitro-4-quinolone-3-carboxylic acid and the sodium salt thereof, a non-toxic, orally-ingestible pharmaceutical carrier and a dispersing agent.

5. A composition according to claim 4 which includes an antibacterial agent selected from the group consisting of penicillins, tetracyclines, sulphonamides, and nitrofurans.

6. A liquid antibacterial composition which comprises as active ingredient a compound selected from the group consisting of 1-methyl-6-nitro-4-quinolone-3-carboxylic acid and the sodium salt thereof, water as a carrier for said active ingredient and at least one excipient selected from the group consisting of sweetening, wetting, dispersing and suspending agents, and preservatives.

7. A composition according to claim 6 in the form of an aqueous suspension wherein the particulate matter is in uniformly finely divided condition.

8. A composition according to claim 6 which includes an antibacterial agent selected from the group consisting of penicillins, tetracyclines, sulphonamides and nitrofurans.

9. A liquid antibacterial composition which comprises as active ingredient a compound selected from the group consisting of 1-methyl-6-nitro-4-quinolone-3-carboxylic acid and the sodium salt thereof, a non-aqueous, non-toxic, orally-ingestible carrier liquid and a dispersing agent.

10. A composition according to claim 9 which includes an antibacterial agent selected from the group consisting of penicillins, tetracyclines, sulphonamides and nitrofurans.

11. A solid, sterile, antibacterial composition which comprises as active ingredient a compound selected from the group consisting of 1-methyl-6-nitro-4-quinolone-3-carboxylic acid and the sodium salt thereof, and a dispersing agent.

12. A composition according to claim 11 which contains an antibacterial agent selected from the group consisting of penicillins, tetracyclines, sulphonamides and nitrofurans.

13. An injectable liquid composition comprising as active ingredient a compound selected from the group consisting of 1-methyl-6-nitro-4-quinolone-3-carboxylic acid and the sodium salt thereof, in a non-toxic, liquid carrier therefor, said composition being sterile and pyrogen-free.

14. A composition according to claim 13 which includes at least one excipient selected from the group consisting of sodium chloride, wetting, dispersing and suspending agents, and preservatives.

15. A composition according to claim 13 wherein said carrier is non-aqueous.

16. A composition according to claim 15 wherein said composition is an isotonic suspension of the active ingredient in oil.

17. A composition according to claim 13 which includes an antibacterial agent selected from the group consisting of penicillins, tetracyclines, sulphonamides and nitrofurans.

18. A composition comprising an animal foodstuff containing a compound selected from the group consisting of 1-methyl-6-nitro-4-quinolone-3-carboxylic acid and the sodium salt thereof.

19. A finely-powdered, antibacterial composition in a form suitable for local application which comprises a substantially uniform admixture of a compound selected from the group consisting of 1-methyl-6-nitro-4-quinolone-3-carboxylic acid and the sodium salt thereof as active ingredient, and a solid, non-toxic, pharmaceutically-acceptable solid diluent selected from the group consisting of magnesium carbonate and corn starch.

20. A finely-powdered, antibacterial composition in a form suitable for local application which comprises a substantially uniform admixture of a compound selected from the group consisting of 1-methyl-6-nitro-4-quinolone-3-carboxylic acid and the sodium salt thereof as active ingredient, and a solid, non-toxic, pharmaceutically-acceptable diluent, said composition also containing an antibacterial agent selected from the group consisting of the penicillins, tetracyclines, sulphonamides and 1:6-bis-p-chlorophenyldiguanidohexane.

21. An antibacterial composition for local application which comprises a semi-solid, substantially uniform dispersion of a compound selected from the group consisting of 1-methyl-6-nitro-4-quinolone-3-carboxylic acid and the sodium salt thereof as active ingredient in a non-toxic, locally-applicable, pharmaceutical carrier, said composition also containing at least one excipient selected from the group consisting of dispersing, suspending and emulsifying agents, and preservatives.

22. An antibacterial composition for local application which comprises a semi-solid, substantially uniform dispersion of a compound selected from the group consisting of 1-methyl-6-nitro-4-quinolone-3-carboxylic acid and the sodium salt thereof as active ingredient in a non-toxic, locally-applicable, pharmaceutical carrier, said composition also containing an antibacterial agent selected from the group consisting of the penicillins, tetracyclines, sulphonamides and 1:6-bis-p-chlorophenyldiguanidohexane.

References Cited in the file of this patent

Price: Australian J. Sci. Research, Series A, Phys. Sci., vol. 2, 1949, pages 279–280.

Drummond: Australian J. Sci. Research, vol. 2, 1949, Series A, Phys. Sci., pages 634–535.